US008195782B2

(12) United States Patent
Yi et al.

(10) Patent No.: US 8,195,782 B2
(45) Date of Patent: Jun. 5, 2012

(54) APPARATUS AND METHOD FOR RECEIVING AND REPRODUCING MULTIMEDIA ENTERTAINMENT CONTENT

(75) Inventors: Byung K. Yi, San Diego, CA (US); Srikantia R. Subramanya, San Diego, CA (US)

(73) Assignee: LG Electronics Inc., Seoul (KR)

( * ) Notice: Subject to any disclaimer, the term of this patent is extended or adjusted under 35 U.S.C. 154(b) by 811 days.

(21) Appl. No.: 11/536,596

(22) Filed: Sep. 28, 2006

(65) Prior Publication Data

US 2008/0082688 A1    Apr. 3, 2008

(51) Int. Cl.
*G06F 15/16*    (2006.01)
*G06F 15/173*    (2006.01)

(52) U.S. Cl. ........ 709/223; 709/217; 709/219; 709/224; 709/226; 709/246

(58) Field of Classification Search .......... 709/217–219, 709/223–226, 246
See application file for complete search history.

(56) References Cited

U.S. PATENT DOCUMENTS

| | | | |
|---|---|---|---|
| 7,505,889 B2 * | 3/2009 | Salmonsen et al. | 703/23 |
| 2002/0049717 A1 * | 4/2002 | Routtenberg et al. | 707/1 |
| 2005/0010671 A1 * | 1/2005 | Grannan | 709/229 |
| 2006/0008256 A1 * | 1/2006 | Khedouri et al. | 386/124 |
| 2006/0092284 A1 * | 5/2006 | Goodman et al. | 348/207.99 |

* cited by examiner

*Primary Examiner* — Wing Chan
*Assistant Examiner* — David X Yi
(74) *Attorney, Agent, or Firm* — Lee, Hong, Degerman, Kang & Waimey

(57) ABSTRACT

An apparatus and method for providing a ubiquitous entertainment environment for a user to browse, search, preview, purchase and use multimedia content easily and in a convenient location. The user can use the selected multimedia contents by connecting a portable storage unit to at least one of a plurality of multimedia equipment devices interfaced with the portable storage unit.

21 Claims, 15 Drawing Sheets

Overview of a typical DRM system

Portable Storage Unit

Alternative Embodiment UES

Portable Storage Unit Display and Control Key Pad

Portable Storage Unit Drivers/Interfaces Map

Portable Storage Unit Hardware Map

Portable Storage Unit Memory Map

Portable Storage Unit Audio/Video Transcoder

Alternate Embodiment of the UES

Portable StorageUnit interfacing with the Multimedia Content Distributor

Portable Storage Unit and Multimedia Content Distributor

Portable StorageUnit and a Multimedia Equipment Device

Overview of a typical DRM system

Flow Diagram for the transfer of content from PC to Portable Storage Unit

Portable Storage Unit interfacing with a Car Stereo System

Flow Diagram for the Portable Storage Unit transferring content to the car stereo system Portable Storage Unit with a DVR system

APPARATUS AND METHOD FOR RECEIVING AND REPRODUCING MULTIMEDIA ENTERTAINMENT CONTENT

FIELD OF THE INVENTION

The present invention relates to a multimedia entertainment system, and particularly, to an apparatus and method for receiving and reproducing multimedia content.

DESCRIPTION OF THE RELATED ART

In general, the technologies for storing and reproducing the multimedia contents have significantly improved with the industry advances in consumer electronics. In a broad sense, multimedia information can be classified as audio, video, and image content. Typical storage devices for multimedia content include: cassette tape, video tape, compact disc (CD), digital video disc (DVD), memory, hard disk, and portable storage devices. In order to reproduce the multimedia contents the following representative devices are used: cassette tape player, video cassette recorder (VCR), CD player (portable/non-portable), DVD player (portable/non-portable), computer (desktop, laptop, PDA, pocket PC, etc), and MP3 player. The technologies for high-density memory and hard disc have made it possible for portable storage devices to be advanced such that they are able to store the multimedia contents from several hundred Megabytes (M bytes) to several hundred Gigabytes (G bytes)

Currently, most users can obtain multimedia contents by purchasing cassette tape, video tape, CD, or DVD. However, the trend of obtaining the multimedia contents is rapidly shifting due to the advance of wireline and wireless Internet-based technologies and the explosive growth of Internet users. In order to distribute and obtain the multimedia contents through the network, the multimedia contents should be stored and distributed in digital formats. Since the conversion of the multimedia contents to digital formats and distribution through the network require a huge memory space and network resources, data compression technologies depending on the contents have been advanced to remove redundant information present in the contents. For instance, MPEG Audio Layer-3 (MP3) is used, in general, to compress audio contents (music, FM broadcast etc) and JPEG is used to compress images. For the compression of video, different methods are used. MPEG-2 or MPEG-4 is used for digital TV broadcasting and AVI (Audio Video Interactive) is used for video on the Windows system.

Since the multimedia contents in cassette tape, video tape, CD, and DVD are selected by the contents provider, a user does not have much freedom to choose the contents of his/her preference and much of the contents are wasteful. Furthermore, in order to reproduce the contents, a user should carry a volume of materials that contain the contents. When the portable storage device is used, it has an advantage of portability due to a compact size. However, it has major drawbacks in that a computer should be used when downloading the contents to the storage device and the contents cannot be regenerated through the consumer electronic devices because they do not have-the capability to accept the contents in the storage device.

Therefore, there is a need for a ubiquitous multimedia entertainment system for effectively purchasing, storing, and reproducing multimedia content for several forms of multimedia equipment. Furthermore, an apparatus and method is needed which allows the user to access contents that the user wants to utilize, store the contents in a portable device, and reproduce, i.e. play, the content using any multimedia equipment device available, regardless of the multimedia format requirements of the designated multimedia equipment device. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims herein, as well as the appended drawings.

Briefly and in general terms, the present invention is directed to an apparatus and method for receiving and reproducing multimedia entertainment content by a user. More particularly, the ubiquitous entertainment system (UES) of the present invention provides the user with a facility for the upload, download, usage, and management of audio and video content in a ubiquitous and transparent manner.

In one embodiment of the present invention, a portable storage device for input, output, use, and management of multimedia content, comprises a portable storage unit adapted to download a user's selected multimedia content in at least one multimedia format, at least one interface for inputting and outputting the selected multimedia content to and from the portable storage unit, a display in communication with a control key pad for facilitating the control and navigation of the portable storage unit, and a processing unit for uploading the selected multimedia content from the portable storage unit to at least one of a plurality of multimedia equipment devices.

In one aspect, the content source for the portable storage device is selected from a local content server, a networked content server connected to the internet, a PC, a laptop, a digital broadcast content, and a digital video recorder (DVR).

In another aspect, the at least one interface for inputting and outputting the selected multimedia content to and from the portable storage unit is at least one of a USB interface, a Bluetooth interface, a Firewire (IEEE1394) interface, WiMax interface, ultra-wideband (UWB) interface and a WiFi interface.

In another embodiment of the present invention, an apparatus for browsing, searching, previewing, and purchasing multimedia content according to a user's interest is presented. The apparatus comprises a multimedia facility adapted for providing at least one service of searching, browsing, previewing, and purchasing a source of multimedia content, a content server having a directory of content, at least one user station terminal for facilitating user interaction for performing the requested service, and a processing unit for receiving and using the purchased multimedia content. The processing unit for receiving and using the purchased multimedia content is provided by a portable storage unit adapted for input, output, use, and management of the multimedia content.

In one aspect, the content server is coupled to a distribution network of at least one external content server for sharing multimedia content between the content server and the at least one external content server coupled to the distribution network when the requested multimedia content is not located in the local content server.

In another embodiment of the present invention, a method for providing a user with input, output, use, and management of multimedia content includes the steps of requesting at least one service of (a) browsing, (b) searching, and (c) previewing a source of multimedia content from a local content server, selecting a desired multimedia content using the at least one service of browsing, searching, and previewing the source of multimedia content, locating the selected multimedia content, purchasing the selected multimedia content, downloading the purchased multimedia content to a portable storage device, and processing the downloaded multimedia content on at least one of a plurality of multimedia equipment devices. The method further comprises decoding/encoding and converting the purchased multimedia content between a first multimedia format and the format of at least one of the plurality of multimedia equipment devices for processing thereon.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for providing a means for allowing the user of the apparatus to upload, download, use, and manage multimedia content in a ubiquitous and transparent manner.

Although the present invention is illustrated with respect to a multimedia facility within specified locations, it is contemplated that the present invention may be utilized anytime and anywhere the user desires through the portable multimedia storage unit.

Reference will now be made in detail to the preferred embodiments of the present invention, examples of which are illustrated in the accompanying drawings.

Figure 1:
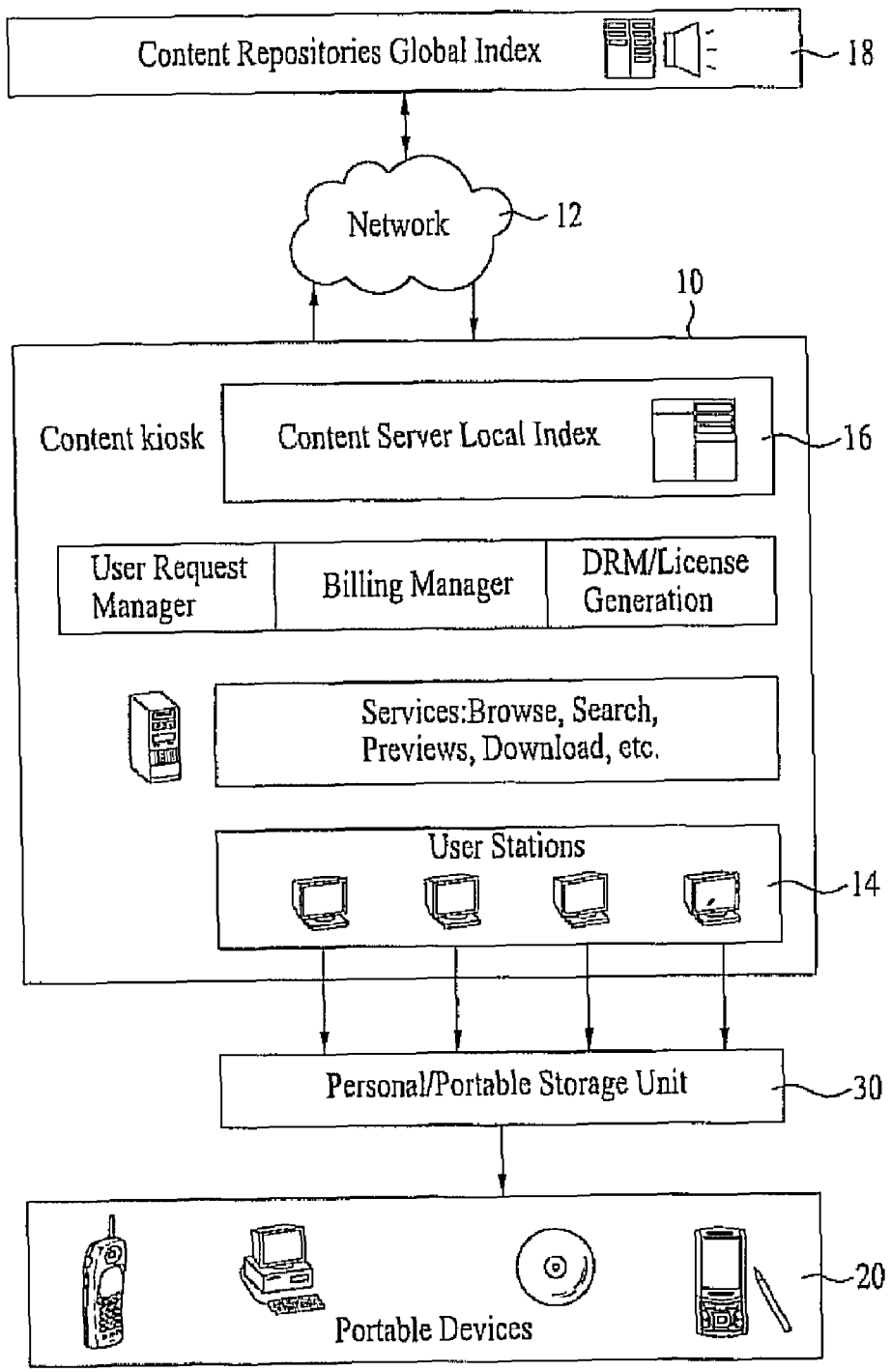
FIG. 1 illustrates an example of the overall system of the Ubiquitous Entertainment System (UES), in accordance with the present invention.

FIG. 1 illustrates an overall system architecture implementing the ubiquitous entertainment system (UES) of the present invention. Generally, a multimedia Kiosk 10, herein referred to as a multimedia facility, provides the users a means for (a) searching, (b) browsing (c) previewing, and (d) purchasing multimedia content of interest. The multimedia facility 10 could be located in several public locations, such as, in shopping malls, train/bus stations, airports, museums, and tourist bureaus. The types of content served could range from those of general interest such as movies, sports, soap operas, songs, and concerts to specialized multimedia content such as videos of city tours, cooking recipes, exercises/work out instruction, training materials, and trouble shooting direction. The multimedia facility 10 can be replaced by a home desktop computer 110 or other computing device having network connections to access multimedia content and interface with the portable storage unit 30, FIG. 3.

The multimedia facility 10 is typically equipped with a local content server 16, performing like a proxy server, and a directory of content. The content server 16 could be part of a huge network 12 of content servers connected by high-speed connections to the Internet or other distributed content repositories 18. It is contemplated that if a requested multimedia content is not available on the local content server 16, then it would be transferred from the nearest networked content server 16 having the requested multimedia content to the requesting content server 16. The multimedia facility 10 includes at least one user station/monitor 14 having at least one of a keyboard and/or a touch pad to facilitate user interaction. The user stations 14 are equipped with speakers and hardware for rendering high quality audio and video and graphics during browse, search or previewing multimedia content, The user terminals 14 provide easy-to-use user interfaces for browsing, querying/searching, and previewing the available multimedia content.

in operation, users can request/select content of their interest and place it in a virtual shopping cart. The UES allows the user to make a payment for purchase of the selected content, and adhere to appropriate DRM (digital rights management) requirements, i.e. licensing rights object, of the purchased multimedia content. The multimedia facility 10 contains a limited set of transcoders for translating content formats from the content repositories 18 to the target multimedia equipment devices 20. For example, for movie content, the DVD format may be the default output format and for music content, the MP3 format may be the default output format. However, the output format is not limited to the default settings.

Figure 2:
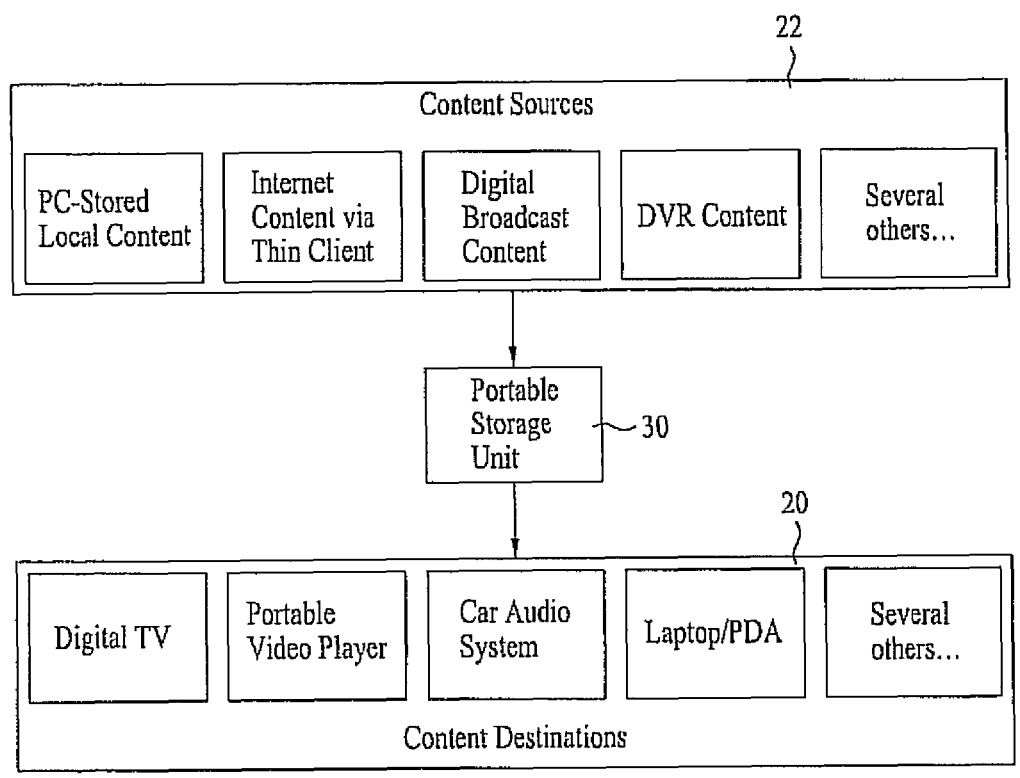
FIG. 2 illustrates the structure of a portable storage unit of FIG. 1.

With reference to FIGS. 1 and 2, a content genie 30, herein referred to as a portable storage unit, is connected to the multimedia facility 10 providing a convenient way of downloading the purchased multimedia content from the content server 16. Once the selected multimedia content is downloaded into the portable storage unit, the user can transfer (upload) the content into at least one of a variety of multimedia equipment 20 interfaced with the portable storage unit 30.

In a preferred embodiment of the present invention, the portable multimedia storage unit 30 includes a combination of hardware and software which facilitates (a) the input of the multimedia content from external sources 22 into the portable storage unit 30, (b) output the multimedia content from the portable storage unit 30 to external multimedia equipment 20, and (q) to navigate and manage the content stored on the portable storage unit. As shown in FIG. 2, the selected multimedia content can be downloaded onto the portable storage unit 30 from any one of many multimedia content sources 22, such as the content stored on hard disks of PCs/laptops, content stored on the Internet, digital broadcast content, digital video recorders (DVRs), and other sources. Accordingly, the stored content on the portable storage unit 30 can be uploaded and played on at least one of the variety of multimedia equipment 20, including DVRs, the hard disks of laptops and personal digital assistants (PDA), mobile communication terminals, digital television, a personal screen in an airplane, and car audio systems. The UES is adapted for compatible interface with all multimedia equipment 20 interfaces.

Figure 3:
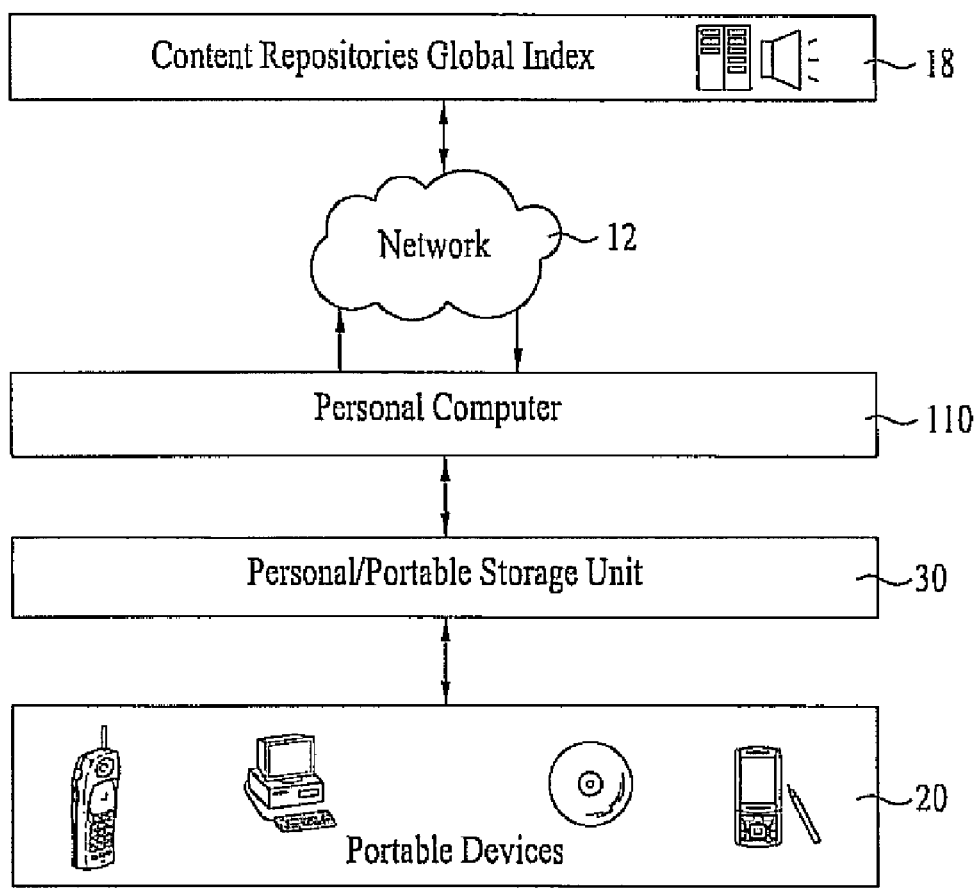
FIG. 3 illustrates an alternative embodiment of the present invention.

In an alternative embodiment of the present invention, as shown in FIG. 3, the multimedia facility 10 is replaced by the user's home desk top computer 110 or other computing device having the capability to access the network 12 and the multimedia content from the content repositories 18, and then interface with the portable storage unit 30 for storing and distributing the content to the variety of multimedia equipment devices 20.

Figure 4:
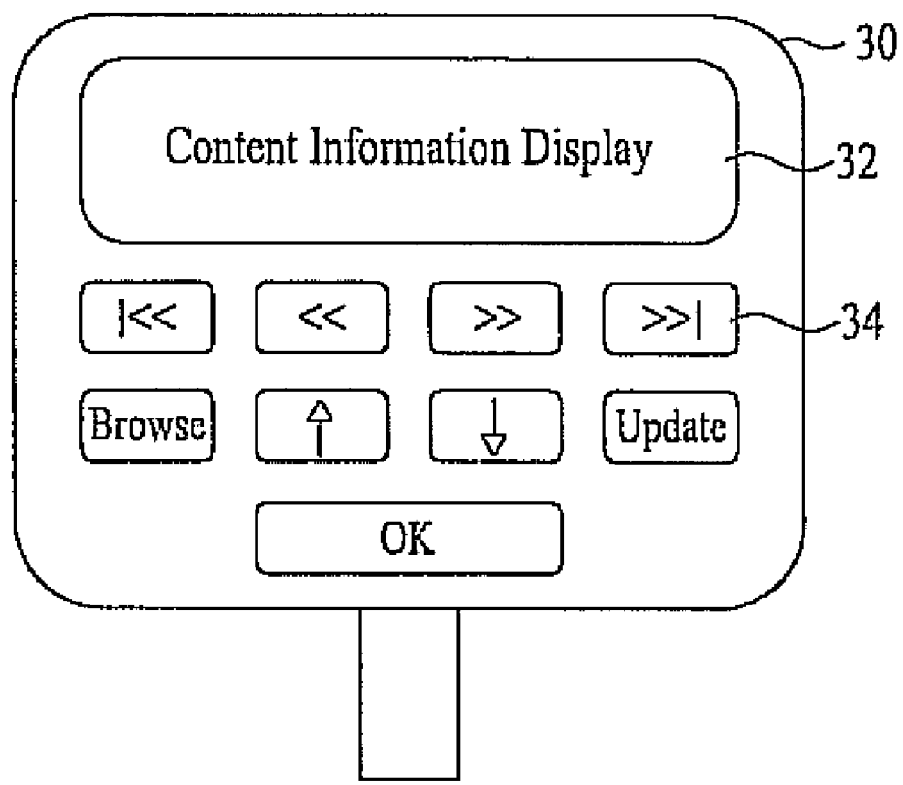
FIG. 4 illustrates the portable storage unit display and control key pad.

FIG. 4 illustrates the portable storage unit display 32 and control key pad 34 to facilitate the various operations of the unit 30.

Figure 5:
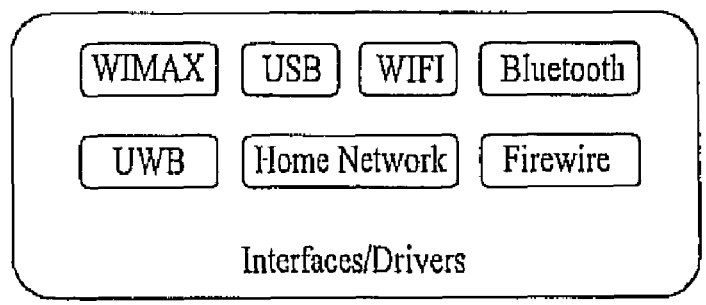
FIG. 5 illustrates the portable storage unit drivers/interfaces.

Preferably, the transfer of the selected multimedia content into and out of the portable storage unit 30 is via a USB port. While the transfer of multimedia content into and out of the portable storage unit 30 may take place via a variety of external interfaces, some typical interfaces and their associated drivers for interfacing with the portable storage unit 30 may include the USB, Firewire (IEEE1394), Bluetooth, WiMax, UWB and WiFi. FIG. 5 illustrates the portable storage unit Drivers/Interfaces map 36.

Figure 6:
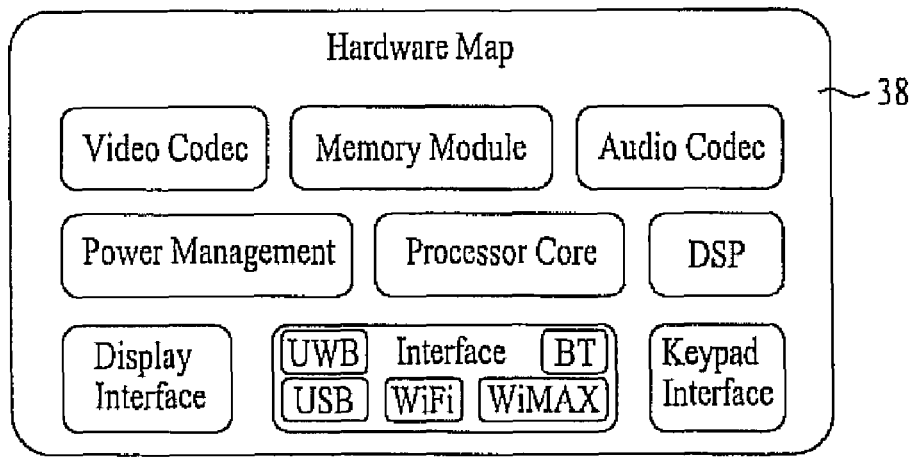
FIG. 6 illustrates the portable storage unit hardware map.

FIG. 6 illustrates a portable storage unit hardware map 38. The major hardware components include the interfaces for content transfer (USB, WiFi, Firewire, and Bluetooth), the interfaces for the keypad buttons and for the display, a battery and associated circuitry for the power management unit, an audio compression/decompression (codec) unit, a video codec unit, and a memory module. The codecs may be implemented as a system-on-chip (SOC). The memory unit, the interfaces, and the codec chipset could be on a single board.

Figure 7:
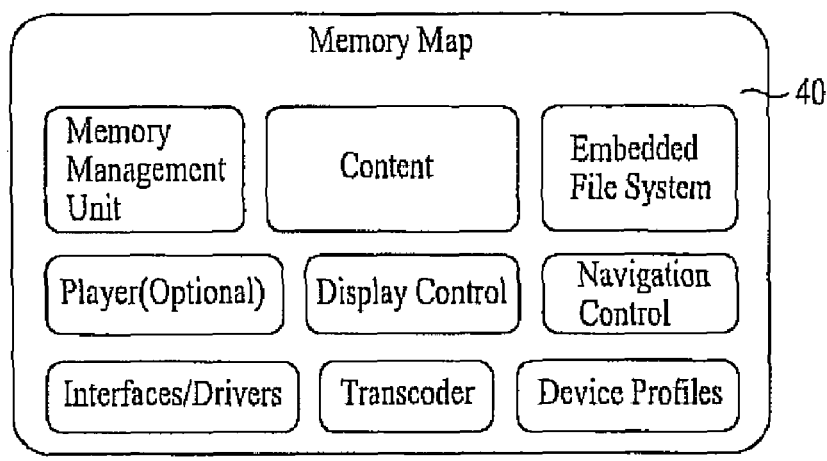
FIG. 7 illustrates the portable storage unit memory map.
Figure 8:
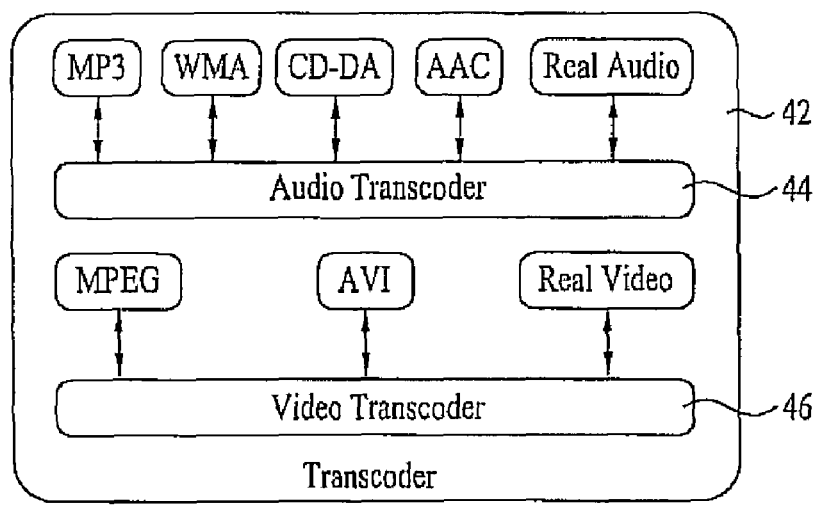
FIG. 8 illustrates the portable storage unit Audio/Video Transcoder unit.

The major firmware components include the Memory Map 40 illustrated in FIG. 7 and the Audio/Video Transcoder unit 42 illustrated in FIG. 8. The Memory Map 40 includes the drivers for the various content transfer interfaces, i.e., USB, Firewire, WiFi, WiMax, and Bluetooth, the driver for the portable storage unit display, the keypad driver, software for control of the user navigation and management of the stored content, the device profiles, and the Transcoder unit 42. The device profiles portion contains external device capabilities which could be used in customizing the multimedia content to suit the device. For example, the device profile could be the bit rate handled by a device or the resolution of the device.

The portable storage unit 30 has the ability to process a variety of multimedia formats due to the Transcoder unit 42 audio Transcoder 44 and video Transcoder 46, which manage decoding/encoding and converting between different multimedia formats. One of the functions of the Transcoder unit 42 is to convert the multimedia format received by the portable storage unit 30 into the format for the multimedia equipment device 20 to which it is supposed to connect and deliver the content. As shown in FIG. 8, some of the various audio multimedia formats processed by the audio Transcoder 44 include the MP3, WMA (windows media audio), CD-DA (compact disk—digital audio, the format used in audio CD), AAC (advanced audio coding), and real audio. The video multimedia formats processed by the video Transcoder 46 include the MPEG, AVI (audio visual interactive), and real video.

Figure 9:
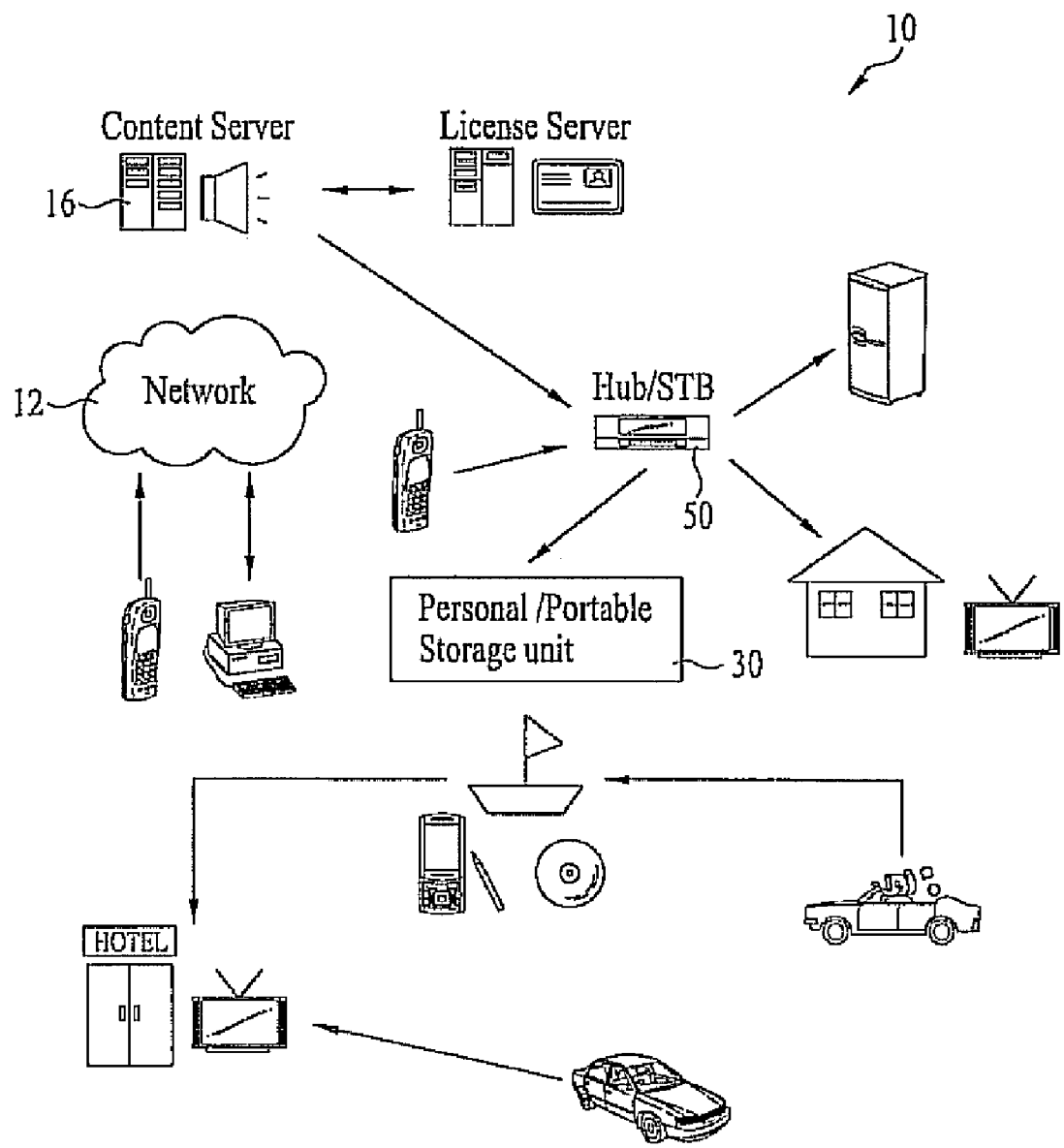
FIG. 9 illustrates an alternate embodiment of the UES.

With reference to FIG. 9, the portable storage unit 30 provides a convenient way of downloading multimedia content at a multimedia facility 10, in locations, such as shopping malls, restaurants, airports, train stations and bus stations. The UES provides the means for facilitating the appropriate payment systems, DRM (digital rights management), and several content-related services, such as directories, browsing, and searching. The UES users can browse, search, purchase, and download content to the portable storage unit 30 to be used in conjunction with appropriate audio or video multimedia equipment players.

The multimedia facility is configured to provide very powerful and sophisticated search facilities for searching multimedia content of interest. A typical search for an audio content of interest could be keyword-based, e.g. songs by a particular artist performed in a given year at a particular location, or content-based, e.g. songs containing a given theme, a particular set of words, or sounding like a given tune. For a video search, the search facility is similar, although it is more complicated in the implementation. Browsing is different from searching, since the users will not have any specific queries. The UES provides an easy navigation mechanism over the content to guide the users over the content space. The preview requests are short clips of audio/video which give the user an indication of the content of the selected multimedia content.

In actual use, after the UES users complete the browsing, previewing, and/or searching steps, they can purchase the selected content. Several schemes are used for deciding multimedia type, amount and the associated pricing of the purchased content. For example, only a very short clip of an audio selection could be purchased, e.g. for a mobile communication terminal ringtone, or only one track of an album can be purchased, or the entire album can be purchased. Similarly, for video selection, short clips of interest, scenes of interest, entire video, or even several volumes of videos can be purchased. Several modes of pricing would support the selected video content of interest. Appropriate DRM components are assumed to be incorporated into the content of the devices.

In another embodiment of the present invention, illustrated in FIG. 9, after the selected content is downloaded onto the portable storage unit, the portable storage unit 30 can be plugged into an STB, or directly to a TV, if either has the appropriate interface, and the selected video content can be viewed on the TV in the user's living room. The portable storage unit can also be plugged into a stereo system, with appropriate interfaces, and the selected audio content can be played on the stereo system. Hypothetically, at a later time, such as later in the evening the portable storage unit could be plugged into a different TV, such as a refrigerator mounted TV having the appropriate interface, and the user can continue viewing the selected multimedia content at a different location. Perhaps, at another time such as the next morning, some selected songs could be played from the portable storage unit into the car stereo system by using the built-in RF transmitter and tuning the car stereo tuner to the transmitter frequency. Alternately, the portable storage unit could be plugged into an on-board socket and the audio can be played on the car stereo speakers. While at a location in a public place, such as the airport, the content can be rendered on a portable DVD player, audio player, or a PDA. If traveling by a shuttle, train, or by bus, the video from the portable storage unit could be played on a portable DVD player or the audio could be played on a portable music player. After reaching the destination, the video from the portable storage unit could be watched on the TV, for example in a hotel room.

Figure 10:
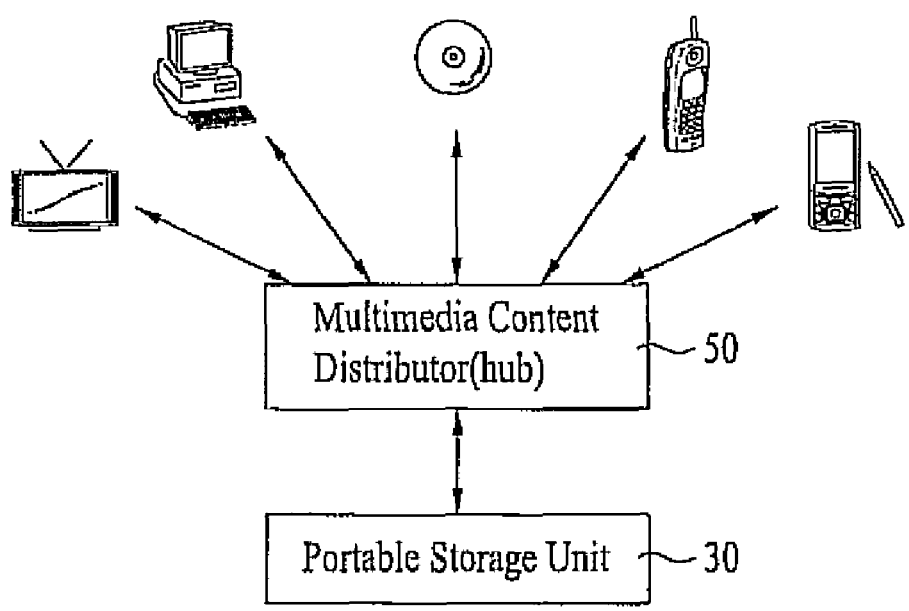
FIG. 10 illustrates a multimedia content distributor connected to the portable storage unit.

In another embodiment of the present invention, a multimedia content distributor 50 is illustrated in association with the portable storage unit 30, see FIG. 10. The multimedia content distributor 50 is essentially a hub which provides a selector or switch to one of a variety of multimedia equipment devices to interact with the portable storage unit. Typical devices could include a digital TV, a DVR, a personal computer (desktop, laptop), a DVD player, a mobile communication terminal, and a PDA (personal digital assistant). In addition to acting as a switch, another important function of the multimedia content distributor 50 is to provide interface conversions, to work as a multi-interface gateway.

For example, if a device has only a Bluetooth interface (typical of small handheld devices), and the portable storage unit has a USB interface, then the selected multimedia content can be transferred from the handheld interface via the multimedia content distributor 50 to the portable storage unit. The multimedia content distributor may optionally have code conversions. The flow of content could be bidirectional. For example, content may be transferred from a PC to the portable storage unit 30 using the multimedia content distributor 50 via a USB port. The content from the portable storage unit 30 may then be rendered on a TV by transferring the content via a DVR player. The audio stored on the portable storage unit could be rendered on a stereo with surround sound where the content is sent via the distributor. Similarly, various other scenarios are possible for input of content from external devices to the portable storage unit, and for the output of content from the portable storage unit to several rendering devices.

Figure 11:
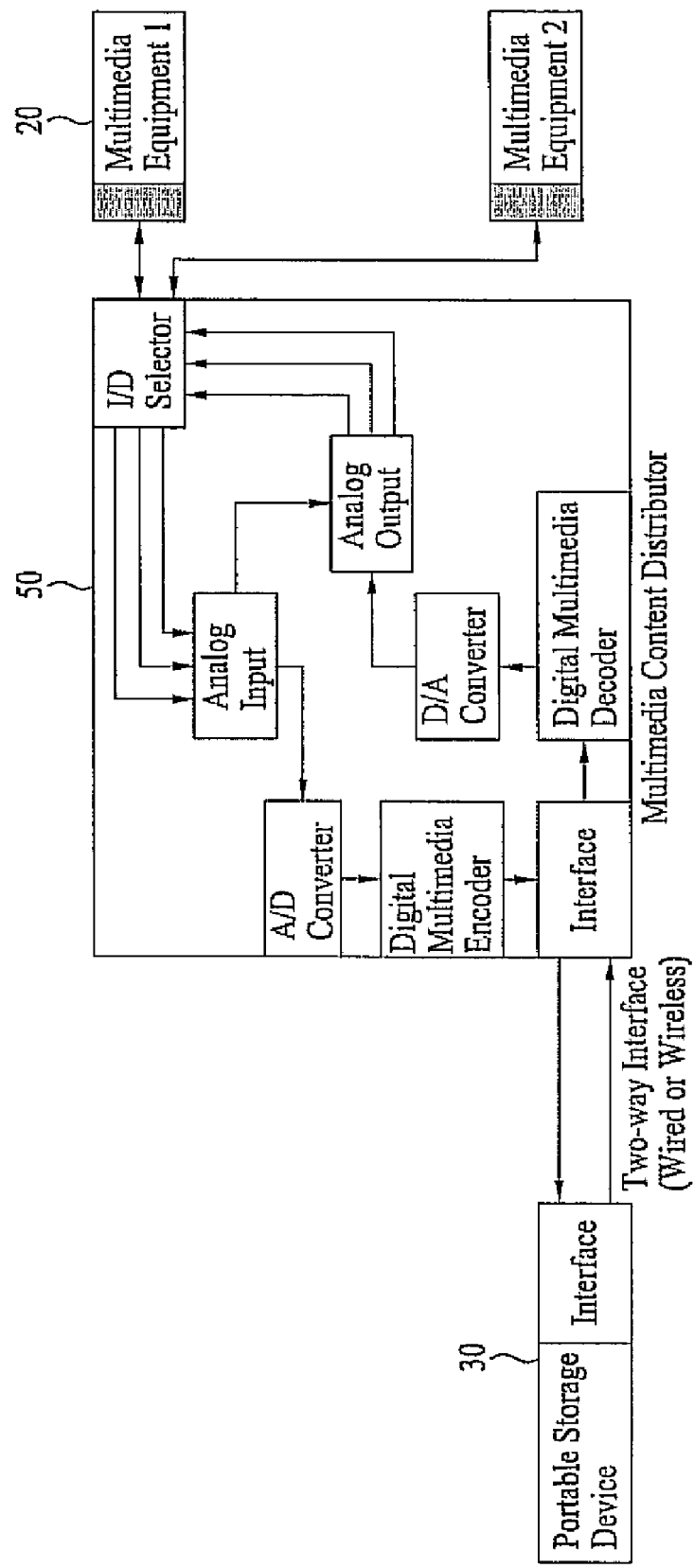
FIG. 11 is a functional block diagram of the portable storage unit and the multimedia content distributor.

FIG. 11 represents a functional block diagram of the portable storage unit 30 and the multimedia content distributor 50 interacting with the associated peripheral multimedia equipment (devices). This centralized distribution equipment 50 has the capability of decoding (decompressing) contents from the portable storage unit 30 and encoding (compressing) contents for the portable storage device. In addition, this centralized distribution equipment 50 can be connected to the Internet via wireline or wireless means so that the multimedia contents can be directly downloaded and played or can be stored into the portable storage unit 30. In addition, the multimedia content distributor 50 has interfaces to the variety of multimedia equipments and acts as a distribution hub, e.g., while using at home, when the portable storage unit 30 is plugged into the multimedia content distributor 50, the content can be delivered to and displayed on the appropriate multimedia equipment.

Figure 12:
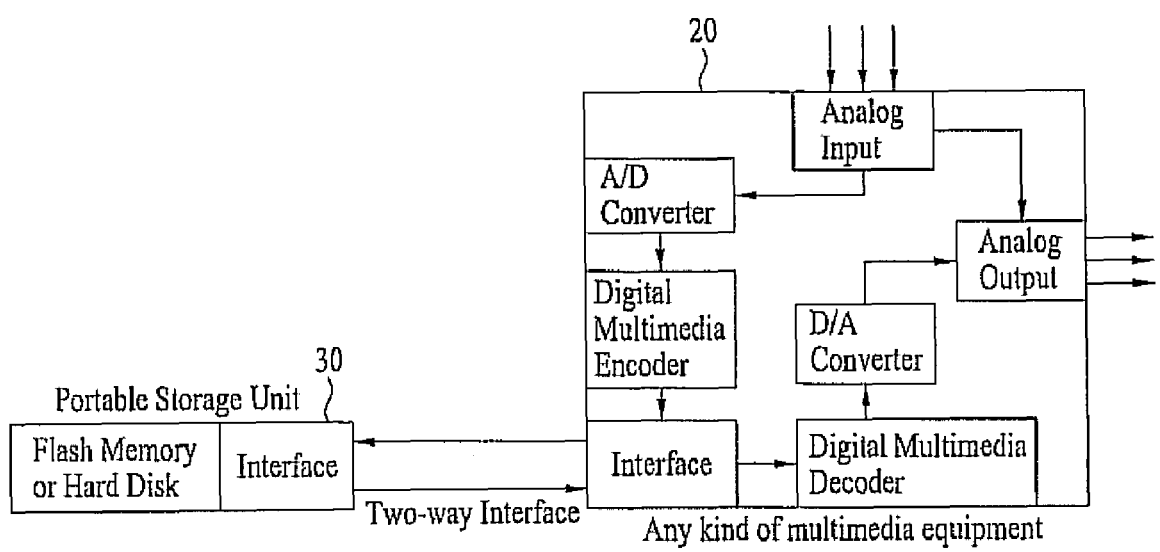
FIG. 12 is an alternate functional block diagram of the portable storage unit and a multimedia equipment device.

In another embodiment of the present invention, the UES does not comprise the multimedia content distributor 50, therefore requiring a direct connection of the portable storage unit 30 to a multimedia equipment device 20 having the matching interface. For example, if a DVD player and the portable storage unit 30 both have a USB interface, then the portable storage unit 30 could be directly connected to the DVD player, and the content can be transferred from the portable storage unit 30 and rendered on the DVD player. FIG. 12 represents the functional block diagram of the multimedia equipment 20 having the capability of interfacing with the portable storage unit 30. The configuration of FIG. 12 requires each multimedia equipment 20 to have the capability of decoding content from the portable storage unit 30 and of encoding contents for the portable storage unit 30. Specifically, the portable storage unit 30 has the transcoding capability to convert the multimedia content to a format suitable for the multimedia equipment.

Figure 13:
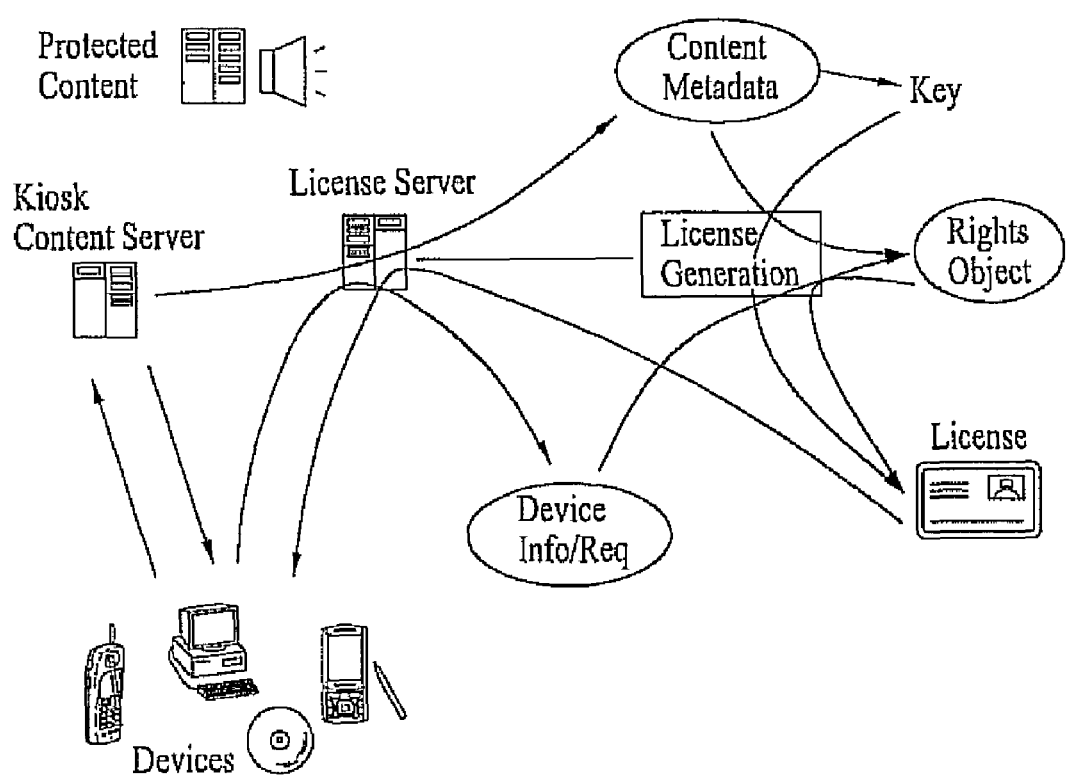
FIG. 13 illustrates an example of the DRM system of the UES of the present invention.

FIG. 13 is an overview of the major operations in a typical DRM (digital rights management) system. The DRM associated with the multimedia content ensures fair use of the selected multimedia content. In addition to the actual content, the DRM derives and maintains metadata, which refers to information about the selected content. It contains information such as, content type, content ID, encryption details, and information about the rights object. A rights object, also known as rights, clearly specifies the permitted ways the associated content can be used by the consumer or the device. Each rights object has an associated syntax and semantics, which is specified by a rights expression language. The rights expression languages enable expressing the terms and conditions of content usage in a clear and unambiguous manner, e.g. Open Digital Rights Language (ODRL) and Extensible Rights Markup Language (XrML). The rights manager is responsible for creating the rights objects and for packaging the rights with a key.

The different types of usage rights are: (a) expiration date—which specifies the date beyond which the content cannot be rendered (played), (b) starting date—before which the content cannot be played, (c) ending date tied to starting date—which specifies that the content is valid for a certain number of days from the date the content is first used, (d) counted playback—which specifies a certain number of times the content can be played back, (e) device types—which specifies the devices on which the content can be played, and (f) media operations—which specify if the media could be transferred to a CD, could be transferred over the network to another device, etc. One of the important requirements for the DRM to be effective is the use of 'trusted devices', that is, devices which conform to certain well defined DRM functions and protocols. The devices which do not conform to these rules are referred to as 'rouge' devices and they are not considered here.

The license contains the rights object which contains the terms and conditions related to the usage of the content. The license also contains the key required to unlock the content, in case it is protected. Using a key seed, which is known only to the content owner/producer and the license provider/manager, and a key ID, a key is produced using a key generation process. This key is used by the content owner/producer to encrypt the content when needed. The key is also packaged along with the rights object to generate the license.

Only upon meeting the terms and conditions in the license, the use of content is enabled. The license could be packaged along with the content or sent separately. The delivery of the license could be implicit, in which case the user will not be aware of the license delivery process, or explicit, in which case the user has to actively participate, perhaps by filling out some forms and providing relevant information. The license is non-transferable. The license could be renewed upon a request, subject to satisfactory conditions of content usage and payment. The license could be revoked when the terms of the license are violated, which renders the content unusable.

By way of example, the user makes a request to the content server 16 for the desired content. If the content is packaged with a license, which is possible in cases where the user/ device characteristics, requirements, credentials, and payment information are known beforehand, then the requested content could be used by the devices immediately. Otherwise, a license needs to be generated after receiving the required information from the user, before the content can be used by the user. The content has a header which could typically consist of: (a) the license acquisition URL, i.e. the URL of the web page of the license provider, (b) the content ID which uniquely identifies the content, (G) content metadata such as author, title, descriptions, types of license, etc., (d) some user defined attributes, (e) DRM version information, and (f) the key ID. These are used by the devices and applications for appropriate rendering of content.

The license can be obtained explicitly when the device makes a license request, or implicitly when the device attempts to use the content. In case of the multimedia facility, the license is generated and packaged with the content. The device sends information about its characteristics, such as, resolution and read/write capabilities, credentials, i.e. device serial number, IP address, if any, intended usage, i.e. number of times to play, to make a backup copy, etc., and payment information. The license server uses the above information received from the device together with relevant information from content metadata to generate the rights object for the particular combination of content and intended usage. It then packages the rights object and the key (required to recover the content in case it is protected) and produces the license and sends it to the device. The device will now be able to consume the content based on the rules specified in the license.

An error-correction code can be implemented to protect the legitimate usage of the purchased multimedia content. For example, a user who wants to utilize the multimedia content can specify how many times he/she wants to reproduce the content. This information can be embedded into the multimedia content that is purchased, delivered, and stored to the portable storage unit 30. The multimedia content is encoded and protected by error-correction code, such as the Reed-Solomon (RS) code. Therein, whenever it is reproduced, an intentional error can be introduced that can be corrected by the processing unit in the portable storage unit 30. When the number of reproductions specified by the user is met, then the number of errors beyond the correction capability of error-correction code in the processing unit is introduced, thus the multimedia content can no longer be utilized.

Figure 14:
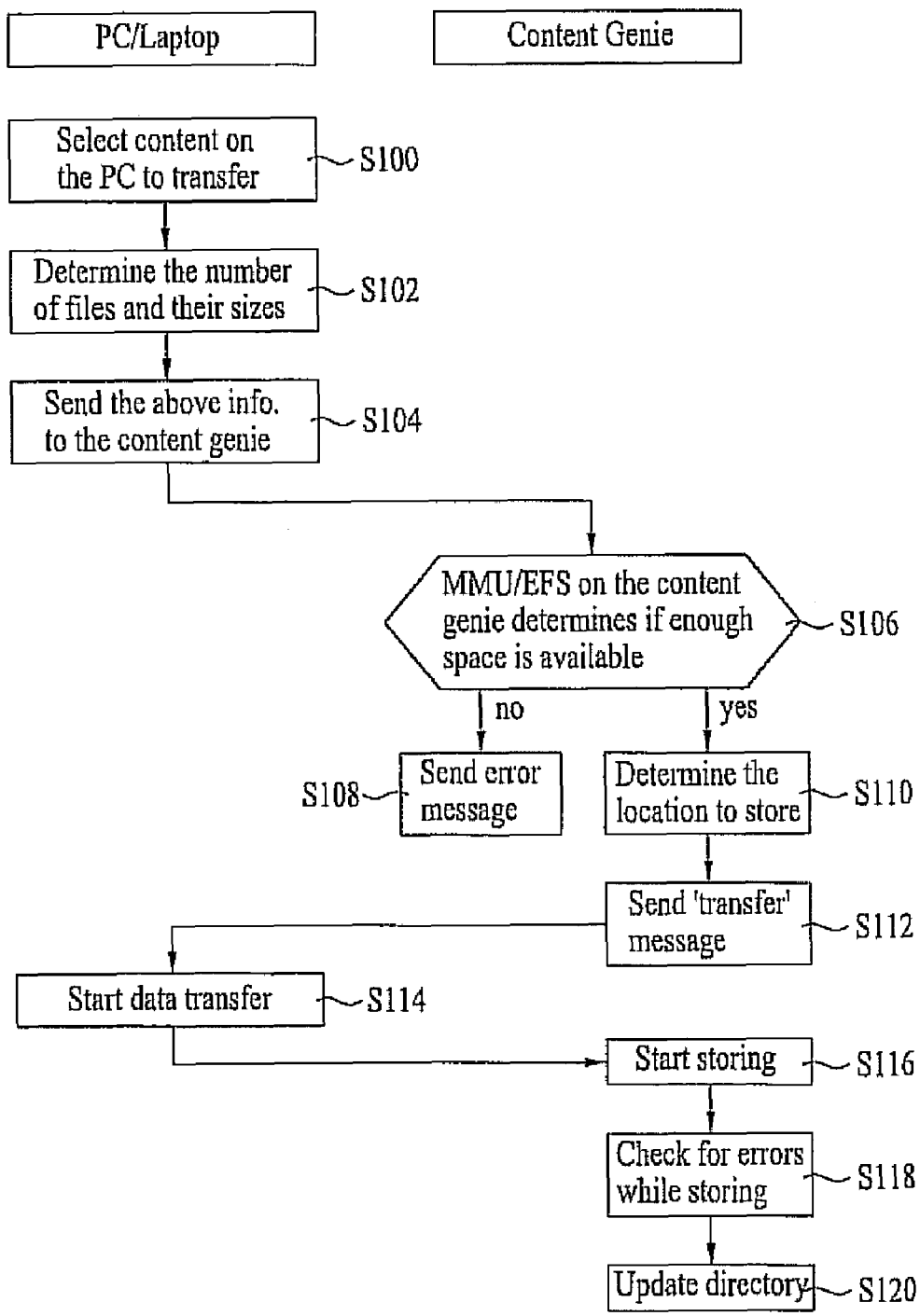
FIG. 14 is a flow diagram of a PC/laptop transfer of content to the portable storage.

In another embodiment of the present invention, the UES provides downloading of multimedia content to the portable storage unit from a PC. The content on the PC is visible via a suitable application (e.g., Windows media player). The host application on the PC provides facilities navigating the content and selecting the content of interest. A flow diagram for the content transfer is shown in FIG. 14. The user selects the video content (a set of files encoded in a format such as MPEG-2) on the hard disk of PC/laptop (S100). The number of files and the total size of transfer is determined (S102) by the host system and sent to the portable storage unit (S104). The memory management system (MMU) and the embedded file system (EFS) on the portable storage unit 30 determine if there is enough room in the memory to store the required content (S106). If not, an error message is sent to the PC (S108), and the transfer does not take place. Otherwise, the MMU/EFS determine the starting location for the content storage (S110). A message to start the transfer is then sent to the PC (S112). The content transfer then starts (S114). The portable storage unit 30 starts storing the content (S116) and checks for and notifies of any errors which occur while storing the content (S118). After successful transfer of content, the file directories on the portable storage unit are updated (S120).

Figure 15:
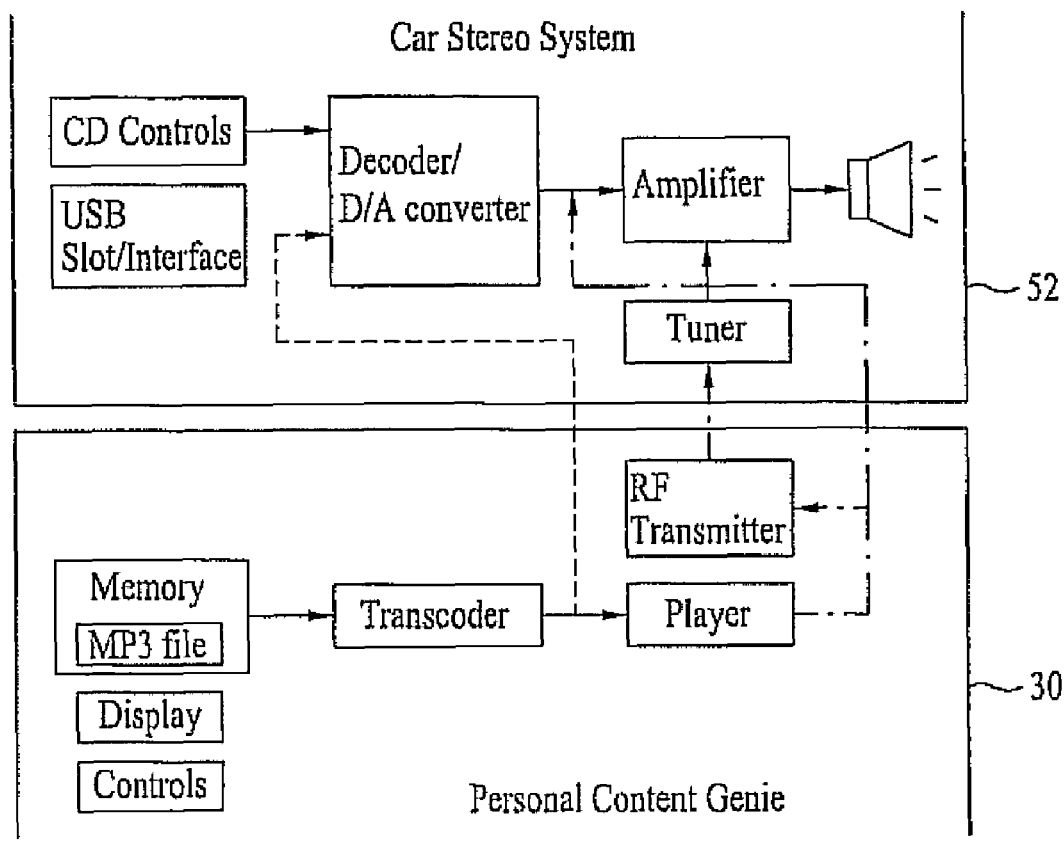
FIG. 15 illustrates the portable storage unit interfacing with a car stereo system.

In another embodiment of the present invention, FIG. 15 illustrates the use of the portable storage unit 30 in conjunction with a car stereo system 52. In this embodiment, there could be several possible modes of use. In one aspect, the car stereo system 52 is equipped with a USB port into which the portable storage unit 30 could be plugged into. The MP3 files in the portable storage unit 30 would be converted into CD audio format by an on-board Transcoder, and a digital audio stream would be channeled to a D/A converter in the car stereo system 52 whose output is fed to an amplifier and then to the car speakers.

Figure 16:
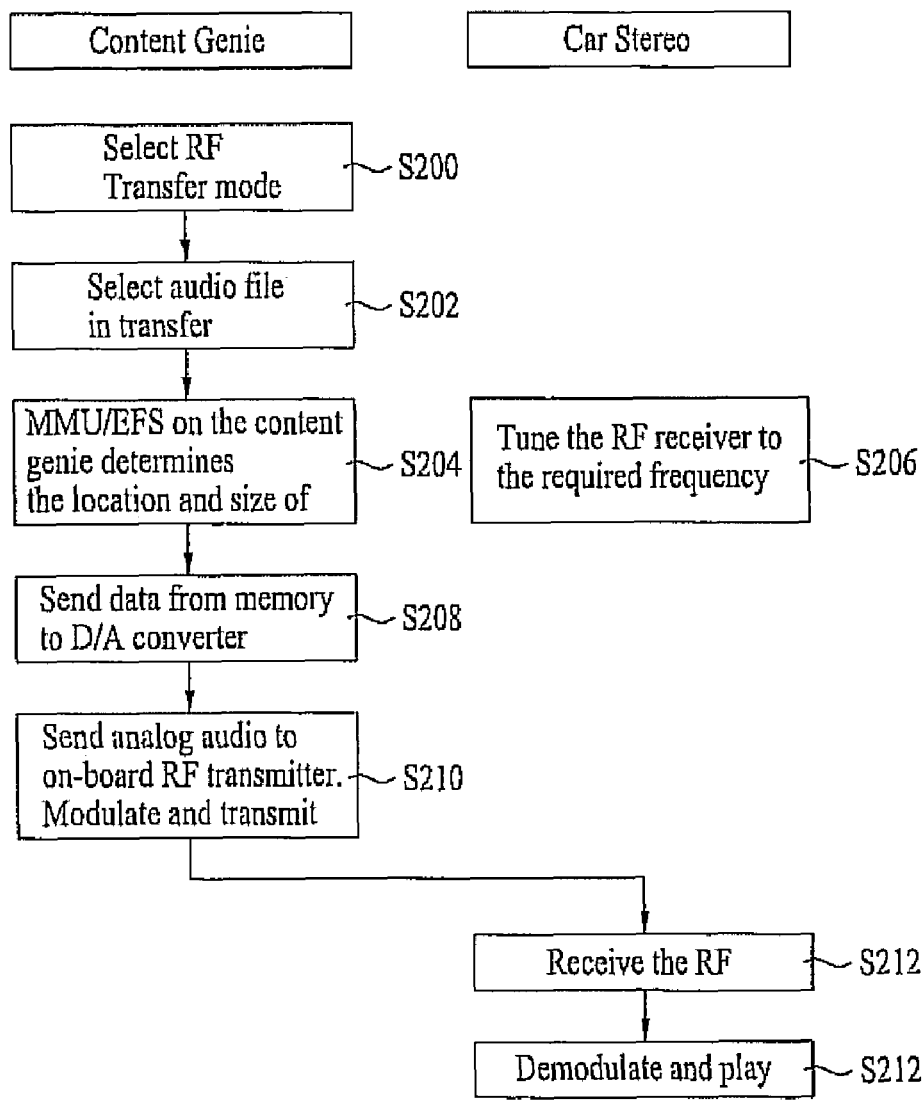
FIG. 16 is a flow diagram of the portable storage unit transferring content to a car stereo system.

In another embodiment of the present invention, as shown in the flow diagram of FIG. 16, multimedia content transfer from the portable storage unit 30 to a car stereo 52 is achieved when the audio content is transferred from the portable storage unit 30. The 'RF transfer mode' is selected on the portable storage unit (S200). The content is selected (S202) using the navigation and selection buttons 34 on the portable storage unit. The MMU/EFS determine the location(s) from where to transfer the audio content, as well as the size(s) of the transfer (s) (S204). The car stereo tuner is tuned to the frequency of the RF transmitter on the portable storage unit (S206). The audio file is transferred from the memory to the D/A converter (S208). The analog audio signal output from the D/A converter is sent to the on-board RF transmitter, which modulates and transmits the RF signal (S210). This signal is received by the tuner/receiver (S212) of the car stereo 52 which is then demodulated and played on the speakers (S214). The volume control of the car stereo would control the volume. However, the selection of songs to be played is done using the navigation and selection buttons 34 on the portable storage unit 30.

Figure 17:
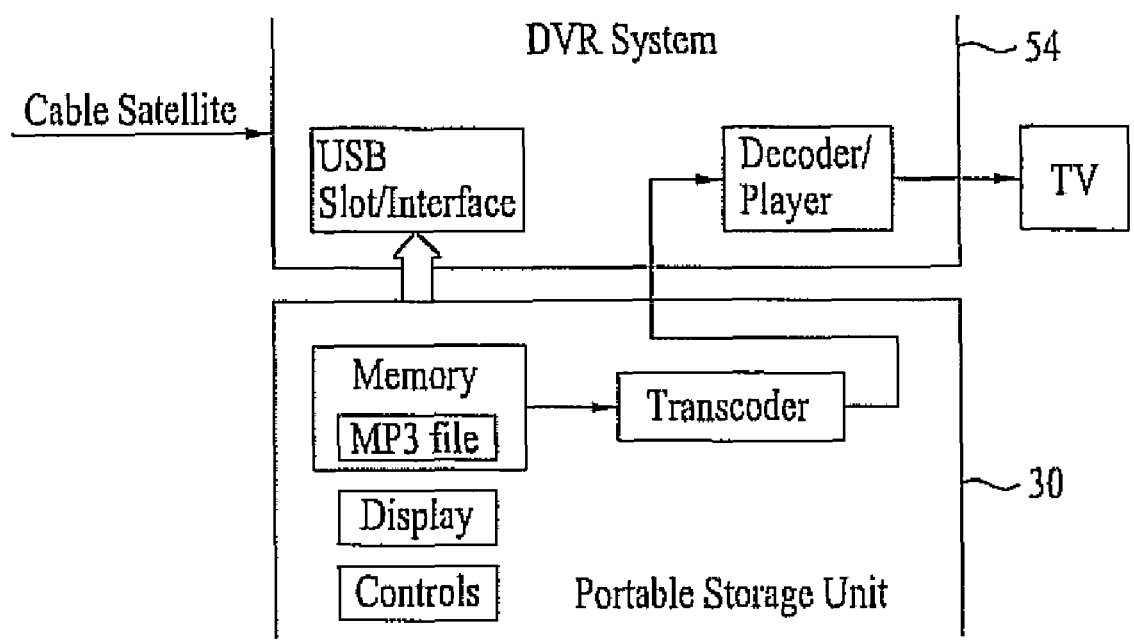
FIG. 17 illustrates the use of the portable storage unit in conjunction with a DVR system.

In another embodiment of the present invention, FIG. 17 illustrates the use of the portable storage unit 30 in conjunction with a DVR system 54. In this case, the format of the video stored on the portable storage unit is converted by the on-board Transcoder 42 to an MPEG format used by the DVR 54. This bit stream is then sent to the DVR 54 which is decoded and played on the TV.

In another example of the various uses of the present invention, if a user wants to travel from Los Angeles, Calif. to Tokyo, Japan, an approximately 10 hour trip, the user can download two movies and 50 songs at home using a home based computer, in accordance with the ubiquitous entertainment system of the present invention. Then on the way to the airport, the user can listen to the music by plugging the portable storage unit 30 into the car stereo system without worrying about format conversion. Moreover, during the 10 hour flight, the user can plug the device into the airplane personalized display unit to play the user's downloaded movies and songs. The contents can be also played even in hotel entertainment system when he/she arrives in Tokyo.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A portable storage device for input, output, use, and management of multimedia content, the portable storage device comprising:
    a portable storage unit for downloading the multimedia content in at least one multimedia format;
    at least one interface for transferring the multimedia content to and from the portable storage unit;
    a display in communication with a control key pad for facilitating the control and navigation of the multimedia content in the portable storage unit;
    a processing unit for uploading the multimedia content from the portable storage unit to at least one of a plurality of multimedia equipment devices that are capable of rendering the multimedia content; and
    a transcoder unit for decoding/encoding and converting the multimedia content between a first multimedia format and a second multimedia format of the at least one of the plurality of multimedia equipment devices,
    wherein the portable storage unit is configured to download the multimedia content from a multimedia facility comprising a content server, wherein the multimedia facility is configured to enable a purchase of the multimedia content locally stored in the content server, wherein the content server is not coupled to the multimedia facility via an Internet connection and is configured to output the multimedia content without using an Internet connection,
    wherein the portable storage unit is further configured to interface with a multimedia content distributor via a first interface,
    wherein the multimedia content distributor is configured to interface with the at least one of the plurality of multimedia equipment devices via a second interface for transferring the multimedia content to be rendered from the portable storage unit to the at least one of the plurality of multimedia equipment devices,
    wherein the first interface uses a different communication protocol than the second interface,
    wherein the content server retrieves the multimedia content from an external content server via a network when the multimedia content is unavailable in a directory of purchasable content stored in the content server,
    wherein the multimedia content enables a digital rights management system for generating a usage license, and an error-correction code adapted to protect a legitimate use of the multimedia content, and
    wherein the digital rights management system generates the usage license by generating rights object using information about characteristics of the at least one of the plurality of multimedia equipment devices along with relevant information from content metadata and packaging the rights object with the multimedia content such that the generated usage license is sent to the device that is to render the multimedia content.

2. The portable storage device of claim 1, wherein the processing unit for uploading the multimedia content comprises at least one interface adapted to connect to the at least one of the plurality of multimedia equipment devices.

3. The portable storage device of claim 2, wherein the at least one of the plurality of multimedia equipment devices is selected from a DVR, a laptop, a PDA, a mobile communication terminal, a digital television, a personal screen in an air plane, and a car audio system.

4. The portable storage device of claim 1, wherein a selector switch selects the at least one of the plurality of multimedia equipment devices to receive the multimedia content.

5. The portable storage device of claim 1, wherein the at least one interface for transferring the multimedia content to and from the portable storage unit is at least one of a Universal Serial Bus (USB) interface, a Bluetooth® interface, a Firewire (IEEE1394) interface, WiMax interface, ultra-wideband (UWB) interface or a WiFi interface.

6. The portable storage device of claim 1, wherein the at least one multimedia format is one of MP3, Windows Media Audio (WMA), Compact Disk Digital Audio (CDDA), Advanced Audio Coding (AAC), Real Audio, MPEG, Audio Visual Interactive (AVI), or Real Video.

7. An apparatus for browsing, searching, previewing, and purchasing multimedia content according to a user's interest, the apparatus comprising:
    a multimedia facility for providing at least one service of searching, browsing, previewing, and purchasing the multimedia content, the multimedia facility comprising a content server locally storing a directory of purchasable content from which the multimedia content is retrieved, wherein the content server is not coupled to the multimedia facility via an Internet connection and is configured to output the multimedia content without using an Internet connection;
    at least one user station terminal for facilitating user interaction for performing the at least one service of searching, browsing, previewing, and purchasing the multimedia content; and
    a processing unit for receiving the multimedia content from the multimedia facility and for using the multimedia content, the processing unit comprising a multimedia storage system adapted to input, output, use, and manage the multimedia content; and
    a digital rights management system for generating a usage license to use the multimedia content,
    wherein the processing unit is configured to interface with a multimedia content distributor via a first interface,
    wherein the multimedia content distributor is configured to interface with at least one of a plurality of multimedia equipment devices that are capable of rendering the multimedia content using a second interface for transferring the multimedia content to be rendered from the processing unit to the at least one of the plurality of multimedia equipment devices, and
    wherein the first interface uses a different communication protocol than the second interface,
    wherein the content server retrieves the multimedia content from an external content server via a network when the multimedia content is unavailable in the directory of purchasable content,
    wherein the digital rights management system comprises an error-correction code adapted to protect a legitimate use of the multimedia content, wherein the digital rights management system generates the usage license by generating rights object using information about characteristics of the at least one of the plurality of multimedia equipment devices along with relevant information from content metadata and packaging the rights object with the multimedia content such that the generated usage license is sent to the device that is to render the multimedia content, and wherein the multimedia storage system comprises:

a portable storage unit adapted to download the multimedia content in at least one multimedia format;

at least one interface for transferring the multimedia content to and from the portable storage unit;

a display in communication with a control key pad for facilitating control and navigation of the portable storage unit;

an output device for uploading the multimedia content from the portable storage unit to the at least one of the plurality of multimedia equipment devices; and a transcoder unit for decoding/encoding and converting the multimedia content between a first multimedia format and a second multimedia format of the at least one of the plurality of multimedia equipment devices.

8. The apparatus of claim 7, wherein the output device for uploading the multimedia content comprises at least one interface adapted to connect to the at least one of the plurality of multimedia equipment devices.

9. The apparatus of claim 7, wherein the at least one of the plurality of multimedia equipment devices is selected from a DVR, a laptop, a PDA, a mobile communication terminal, a digital television, a personal screen in an airplane, and a car audio system.

10. The apparatus of claim 7, wherein a selector switch selects the at least one of the plurality of multimedia equipment devices to receive the multimedia content.

11. The apparatus of claim 7, wherein the at least one interface for transferring the multimedia content to and from the portable storage unit is at least one of a Universal Serial Bus (USB) interface, a Bluetooth® interface, a Firewire (IEEE1394) interface, a WiMax interface, an ultra-wideband (UWB) interface, or a WiFi interface.

12. The apparatus of claim 7, wherein the at least one multimedia format is one of MP3, Windows Media Audio (WMA), Compact Disk Digital Audio (CDDA), Advanced Audio Coding (AAC), Real Audio, MPEG, Audio Visual Interactive (AVI), or Real Video.

13. A method performed by a multimedia facility comprising a local content server for providing a user with input, output, use, and management of multimedia content, the method comprising:

requesting at least one service of browsing, searching, and previewing the multimedia content in a directory of purchasable content locally stored in the local content server;

selecting the multimedia content using the at least one service of browsing, searching, and previewing the multimedia content;

locating the multimedia content;

purchasing the multimedia content;

downloading the multimedia content to a portable storage device from the multimedia facility, wherein the local content server is not coupled to the multimedia facility via an Internet connection and is configured to output the multimedia content without using an Internet connection;

decoding/encoding and converting the downloaded multimedia content between a first multimedia format and a second multimedia format of at least one of a plurality of multimedia equipment devices;

processing the multimedia content in the at least one of the plurality of multimedia equipment devices; and generating a license for usage of the multimedia content, wherein the portable storage device is configured to interface with a multimedia content distributor via a first interface, wherein the multimedia content distributor is configured to interface with the at least one of the plurality of multimedia equipment devices that are capable of rendering the multimedia content using a second interface to transfer the multimedia content to be rendered from the portable storage device to the at least one of the plurality of multimedia equipment devices, and wherein the first interface uses a different communication protocol than the second interface, wherein the local content server retrieves the multimedia content from an external content server via a network when the multimedia content is unavailable in the directory of purchasable content, and wherein the license is generated by generating rights object using information about characteristics of the at least one of the plurality of multimedia equipment devices along with relevant information from content metadata and packaging the rights object with the multimedia content such that the generated usage license is sent to the device that is to render the multimedia content.

14. The method of claim 13, wherein the requested at least one service of browsing, searching, and previewing the multimedia content is performed at the local content server.

15. The method of claim 13, wherein the multimedia content is processed by the at least one of the plurality of multimedia equipment devices selected from a DVR, a laptop, a PDA, a mobile communication terminal, a digital television, a personal screen in an airplane, and a car audio system.

16. A method performed by a multimedia facility comprising a local content server for providing a user with input, output, use, and management of multimedia content, the method comprising:

requesting at least one service of browsing, searching, and previewing the multimedia content in a directory of purchasable content locally stored in the local content server;

selecting the multimedia content using the at least one service of browsing, searching, and previewing the multimedia content;

locating the multimedia content;

purchasing the multimedia content;

generating a digital rights management license to use the multimedia content;

downloading the multimedia content to a portable storage device from the local content server without using an Internet connection;

converting the downloaded multimedia content between a first multimedia format and a second multimedia format of at least one multimedia equipment device; and embedding an error-correction code in the multimedia content for protecting a legitimate usage of the multimedia content, wherein the local content server is not coupled to the multimedia facility via the Internet connection, wherein the portable storage device is configured to interface with a multimedia content distributor via a first interface, wherein the multimedia content distributor is configured to interface with the at least one multimedia equipment device that are capable of rendering the multimedia content using a second interface to transfer the multimedia content to be rendered from the portable storage device to the at least one multimedia equipment device, wherein the first interface uses a different communication protocol than the second interface, wherein the local content server retrieves the multimedia content from an external content server when the multimedia content is unavailable in the directory of purchasable content, and wherein the digital rights management license is generated by generating rights object using information about characteristics of the at least one of the plurality of multimedia equipment devices along with relevant information from content metadata and packaging the rights object with the multimedia content such that the generated digital rights management license is sent to the device that is to render the multimedia content.

17. The method of claim 16, wherein the requested at least one service of browsing, searching, and previewing the multimedia content is performed at the local content server.

18. The method of claim 16, wherein the multimedia content is converted by the at least one multimedia equipment device, wherein the at least one multimedia equipment device is selected from a DVR, a laptop, a PDA, a mobile communication terminal, a digital television, a personal screen in an airplane, and a car audio system.

19. An apparatus for browsing, searching, previewing, purchasing, and using multimedia content according to a user's interest, the apparatus comprising:
   a multimedia facility comprising a computing device for providing at least one service of searching, browsing, previewing, and purchasing the multimedia content and a networked content server locally storing a directory of purchasable multimedia content;
   a portable storage unit for downloading the multimedia content from the multimedia facility in at least one multimedia format;
   at least one interface for transferring the multimedia content to and from the portable storage unit;
   a display in communication with a control key pad for facilitating control and navigation of the portable storage unit;
   an output device for uploading the multimedia content from the portable storage unit to at least one of a plurality of multimedia equipment devices;
   a transcoder unit for decoding/encoding and converting the multimedia content between a first multimedia format and a second multimedia format of the at least one of the plurality of multimedia equipment devices; and
   a digital rights management system for generating a usage license to use the multimedia content,
   wherein the portable storage unit is configured to interface with a multimedia content distributor via a first interface,
   wherein the multimedia content distributor is configured to interface with the at least one of the plurality of multimedia equipment devices that are capable of rendering the multimedia content using a second interface to transfer the multimedia content to be rendered from the portable storage unit to the at least one of the plurality of multimedia equipment devices,
   wherein the first interface uses a different communication protocol than the second interface,
   wherein the multimedia facility controls the content server to retrieve the multimedia content from an external content server via a network when the multimedia content is unavailable in a directory of purchasable content stored in the content server,
   wherein the digital rights management system comprises an error-correction code adapted to protect a legitimate use of the multimedia content, and
   wherein the digital rights management system generates the usage license by generating rights object using information about characteristics of the at least one of the plurality of multimedia equipment devices along with relevant information from content metadata and packaging the rights object with the multimedia content such that the generated usage license is sent to the device that is to render the multimedia content.

20. The apparatus of claim 19, wherein the output device for uploading the multimedia content comprises at least one interface adapted to connect to the at least one of the plurality of multimedia equipment devices.

21. The apparatus of claim 20, wherein the at least one of the plurality of multimedia equipment devices is selected from a DVR, a laptop, a PDA, a mobile communication terminal, a digital television, a personal screen in an airplane, and a car audio system.

* * * * *